March 18, 1930.  A. F. HERMAN  1,751,405
TERMINAL AND METHOD OF MAKING SAME
Filed March 10, 1926
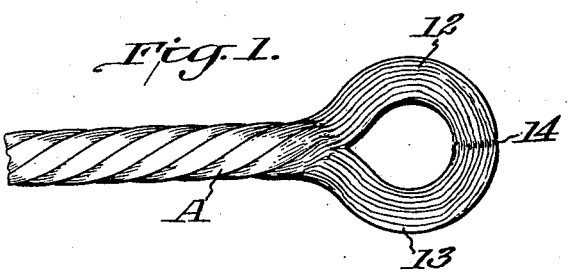
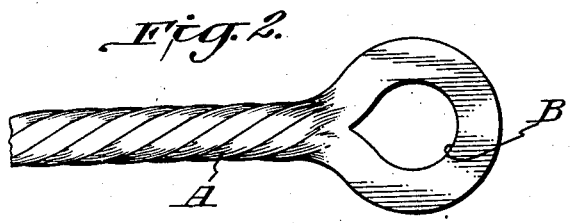
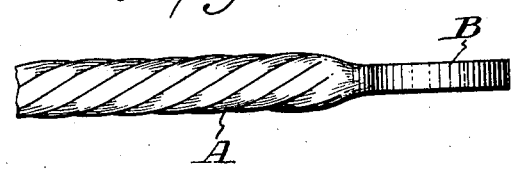

Patented Mar. 18, 1930

1,751,405

UNITED STATES PATENT OFFICE

ALBERT FRANK HERMAN, OF CLEVELAND, OHIO, ASSIGNOR TO NATIONAL CARBON COMPANY, INC., A CORPORATION OF NEW YORK

TERMINAL AND METHOD OF MAKING SAME

Application filed March 10, 1926. Serial No. 93,723.

This invention relates to cable terminals and more specifically to an improved method of forming an attaching terminal eye at the end of a stranded electrical cable or conductor.

Heretofore, electric cable terminals in the form of an eye have been formed from sheet metal and attached to the end of the cable by mechanical means, or by solder, or by both. The objections to this type of terminal have been the cost of making the separate parts and attaching them to the cable, and the liability of securing a poor electrical connection between the terminal and the cable.

The object of my improved cable terminal is to entirely do away with all separate parts and, as a result, all expense of attaching them and all liability of poor connections and, at the same time, to secure a neater, cheaper, and better terminal.

Broadly speaking, my improved method comprises separating the strands at the end of a stranded conductor into two groups and bending the two groups of strands into semicircular shape. The semicircular portions are arranged to face one another and their ends are disposed close together or overlap so that an eye is formed at the end of the conductor. Molten metal, such as a solder of lead and tin, is applied to this eye, as by dipping the eye into a body of such metal. When the eye is withdrawn and while the adhering metal is still plastic, the eye is subjected to pressure to provide a compact symmetrical terminal.

The objects and novel features of the invention will be more clearly understood by referring to the illustrations in which:

Fig. 1 is a plan view of a part of a stranded cable prepared for dipping in molten metal according to my invention; and Figs. 2 and 3 are, respectively, a plan view and an edge view of my improved terminal formed on the end of a stranded electrical conductor.

In forming this improved terminal, I take a stranded cable or conductor A of copper or the like and, beginning at the end, separate the strands into two substantially equal groups 12 and 13 back a distance slightly more than half the circumference of the finished eye B. These two groups of strands are then bent around a mandrel or otherwise formed to a semicircular shape, the semicircular portions being arranged to face one another. The ends of the groups 12 and 13 are disposed close together or overlap so that the end of the cable will have approximately the shape of the finished eye. When in this condition it is desirable that the ends of the two groups of strands overlap at the point 14, though this is not necessary. The eye or terminal, being formed of portions of the cable, is thus an integral part of the latter, and provides a recess at the end of the conductor for receiving a pin, rivet or other fastening device whereby the conductor may be secured to a current-collecting brush or the like.

The eye B roughly formed in the end of the cable A, as above described, is then dipped or immersed in a bath of molten solder, lead, tin, zinc, or other metal, and each strand composing the eye is thoroughly coated with the molten metal so the portion of the cable forming the eye is thoroughly impregnated and the spaces between the strands remain filled with the metal when the eye is withdrawn from the bath. While it is convenient to dip the eye into the body of metal to apply the molten metal thereto, it will be obvious that other methods of applying such molten metal may be employed.

The metal-impregnated terminal eye B is then withdrawn from the bath and while the metal solder or the like is still plastic, is cooled and solidified by compressing it between a punch and die, or between two dies, of the proper size and shape to force the molten metal encased strands into the form of a rigid, flattened finished eye, as shown at B. This unites the individual strands in each group to one another and the ends of the two groups at 14, and provides a solid symmetrical eye having flat faces on its opposite sides.

The forming punch and die, or dies absorb sufficient of the heat which keeps the terminal impregnating metal molten and, therefore, the terminal eye is formed, moulded, or cast and the impregnating metal is cooled or frozen at the same time, so the terminal eye comes from the forming die in a solid and self-supporting state.

The terminal illustrated is of general application but is particularly adapted for use as a shunt or pigtail connection for a current-collecting brush for dynamo electric machines. According to the various conditions under which the improved terminal may be used, it may be formed by arranging the cable strands differently than here shown, the eye may be formed at any point along the cable, the applied metal may be non-molten plastic metal and may be applied to the eye or conveyed to the die by any of the well known methods not herein described. Furthermore, the shape or form of the improved cable terminal may be other than herein shown, such, for instance, as a fork, or an eye with an open end or side. It will therefore be understood that this invention is not limited to the exact form and method described and illustrated.

Having thus described my invention, I claim:

1. A method of making a cable terminal that comprises forming an eye of portions of a cable; dipping said eye in a bath of molten metal; withdrawing said eye from said bath; and applying pressure to said eye and the metal adhering thereto to shape the same.

2. A method of making a cable terminal that comprises forming an eye of portions of a cable; applying molten metal to said eye; and pressing said metal-covered eye into shape while said metal is plastic.

3. A method of forming an eye at the end of a stranded electric conductor comprising: bending the strands at the end of said conductor into the form of an eye; dipping said eye into molten metal; and forming said eye into shape under pressure.

4. A method of forming an eye in a stranded electric conductor that comprises dividing the strands and bending them into the form of an eye; applying plastic metal to said eye; and forming said eye into shape under pressure while such applied metal is plastic.

5. A method of forming an eye at the end of a stranded electric conductor that comprises separating the strands at the end of said conductor and bending them into the form of an eye with their ends close together; applying molten metal to such separated strands and at their adjoining ends; and forming said eye into shape under pressure.

6. A method of forming an attaching eye in the end of a stranded electric cable that comprises separating the strands at the end of said cable into two substantially equal groups; bending said groups into the form of an eye with the ends of said groups close together; dipping said eye into molten metal; and forming said eye into shape under pressure.

7. A stranded electric conductor having an integral eye at the end thereof formed by two separated and semi-circularly bent groups of strands at the end of said conductor, and metal in the spaces between the strands uniting the strands in each group, the ends of the strands in the two groups being disposed close together and united by said metal.

8. A method of forming an eye in a conductor that comprises separating adjoining portions of said conductor and forming such portions into an eye; applying metal to such separated portions; and forming said eye into shape under pressure.

9. A method of forming an eye in a stranded cable that comprises separating adjoining portions of said cable and forming such portions into an eye; applying solder to such separated portions; and applying pressure to such solder-covered separated portions to shape said eye.

In testimony whereof, I affix my signature.

ALBERT FRANK HERMAN.